United States Patent
Schmalenberg et al.

(10) Patent No.: US 9,921,307 B2
(45) Date of Patent: Mar. 20, 2018

(54) COMBINED RADAR SENSOR AND LIDAR SENSOR PROCESSING

(71) Applicant: Toyota Motor Engineering & Manufacturing North America, Inc., Erlanger, KY (US)

(72) Inventors: Paul Donald Schmalenberg, Ann Arbor, MI (US); Jae Seung Lee, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 448 days.

(21) Appl. No.: 14/610,549

(22) Filed: Jan. 30, 2015

(65) Prior Publication Data
US 2016/0223663 A1  Aug. 4, 2016

(51) Int. Cl.
*G01S 13/86* (2006.01)
*G01S 17/93* (2006.01)
(Continued)

(52) U.S. Cl.
CPC .......... *G01S 13/865* (2013.01); *G01S 7/4813* (2013.01); *G01S 13/931* (2013.01); *G01S 17/936* (2013.01); *G01S 2007/027* (2013.01)

(58) Field of Classification Search
CPC ........ G01S 13/86; G01S 13/865; G01S 13/93; G01S 13/931; G01S 2013/9321; G01S 2013/9367
(Continued)

(56) References Cited

U.S. PATENT DOCUMENTS

| 4,975,705 A | * | 12/1990 | Gellekink | G01S 13/66 |
| | | | | 342/195 |
| 5,327,149 A | * | 7/1994 | Kuffer | G01S 13/86 |
| | | | | 342/53 |

(Continued)

FOREIGN PATENT DOCUMENTS

| DE | 102008052246 A1 | 4/2010 |
| KR | 1293108 B1 | 8/2013 |

OTHER PUBLICATIONS

Plafke; "Revolutionary new 2D optical phased array is packed onto a single, tiny chip"; [retrieved Jan. 30, 2015] retrieved from the Internet: <http://www.extremetech.com/extreme/145909-revolutionary-new-2d-optical-phased-array-is-packed-onto-a-single-tiny-chip>, Jan. 18, 2013; 4 pages.

(Continued)

*Primary Examiner* — Peter M Bythrow
(74) *Attorney, Agent, or Firm* — Christopher G. Darrow; Darrow Mustafa PC

(57) ABSTRACT

Arrangements related to sensing systems and methods are described. A sensing system can include one or more LIDAR sensors. The one or more LIDAR sensors can be configured to output signals. The sensing system can include one or more RADAR sensors. The one or more RADAR sensors can be configured to output signals. The sensing system can include a processor. The processor can be operatively connected to receive signals output by the LIDAR sensor(s) and the RADAR sensor(s). The processor can be configured to process signals received from both the LIDAR sensor(s) and the RADAR sensor(s) together. In some arrangements, the LIDAR sensor(s) and the RADAR sensor(s) can be located within the same housing. In one or more arrangements, the LIDAR sensor(s) and/or the RADAR sensor(s) can be
(Continued)

configured as a phased array. In one or more arrangements, the sensing system can be used in connection with a vehicle.

22 Claims, 4 Drawing Sheets

(51) Int. Cl.
G01S 7/481 (2006.01)
G01S 13/93 (2006.01)
G01S 7/02 (2006.01)

(58) Field of Classification Search
USPC .................................................. 342/54, 70
See application file for complete search history.

(56) References Cited

U.S. PATENT DOCUMENTS

| | | | | |
|---|---|---|---|---|
| 5,467,072 A * | 11/1995 | Michael | ................ | G01S 13/931 340/436 |
| 5,471,214 A * | 11/1995 | Faibish | ................ | G01S 13/931 342/54 |
| 6,037,860 A * | 3/2000 | Zander | ................ | B60W 30/09 307/10.1 |
| 6,061,015 A * | 5/2000 | Sugimoto | .......... | B60K 31/0008 342/27 |
| 6,169,478 B1 * | 1/2001 | Hada | .......... | B60T 7/22 340/435 |
| 8,565,481 B1 * | 10/2013 | Smith | ................ | G06K 9/00214 348/169 |
| 8,825,259 B1 * | 9/2014 | Ferguson | ............. | G05D 1/0214 104/124 |
| 8,825,260 B1 * | 9/2014 | Silver | ................... | G01S 17/936 342/118 |
| 8,996,228 B1 * | 3/2015 | Ferguson | ........... | G01C 21/3461 348/118 |
| 9,014,903 B1 * | 4/2015 | Zhu | .................... | G01C 21/3446 382/103 |
| 9,063,549 B1 * | 6/2015 | Pennecot | ............ | G05D 1/0259 |
| 9,086,481 B1 * | 7/2015 | Dowdall | ................. | G01S 17/58 |
| 9,097,800 B1 * | 8/2015 | Zhu | ....................... | G01S 13/865 |
| 9,221,396 B1 * | 12/2015 | Zhu | ....................... | B60Q 9/008 |
| 9,261,590 B1 * | 2/2016 | Brown | .................... | G01S 13/10 |
| 9,285,230 B1 * | 3/2016 | Silver | .................... | G01C 21/26 |
| 9,423,498 B1 * | 8/2016 | Brown | ..................... | G08G 1/16 |
| 2003/0030582 A1 * | 2/2003 | Vickers | ................. | G01S 17/023 342/54 |
| 2006/0125680 A1 * | 6/2006 | Thackray | ................. | G01S 7/41 342/54 |
| 2007/0005609 A1 * | 1/2007 | Breed | .................... | B60N 2/2863 |
| 2010/0175573 A1 * | 7/2010 | Cornett | ................... | F41H 11/02 102/201 |
| 2012/0038539 A1 * | 2/2012 | Chang | .................... | H01Q 1/422 343/872 |
| 2012/0120382 A1 * | 5/2012 | Silny | ...................... | G01S 17/42 356/4.01 |
| 2013/0060548 A1 * | 3/2013 | Shimizu | ................ | G01S 17/023 703/8 |
| 2013/0082866 A1 * | 4/2013 | Jaganathan | ............. | G01S 13/88 342/22 |
| 2013/0222174 A1 * | 8/2013 | Choe | ..................... | G05D 1/0248 342/54 |
| 2013/0241761 A1 * | 9/2013 | Cooper | ................. | G01S 7/4812 342/54 |
| 2013/0265189 A1 * | 10/2013 | Chang | ..................... | G01S 17/87 342/52 |
| 2014/0032012 A1 * | 1/2014 | Joshi | ...................... | G01S 13/865 701/1 |
| 2014/0032167 A1 * | 1/2014 | Mayer | ..................... | G06F 17/18 702/179 |
| 2014/0139368 A1 * | 5/2014 | Takaki | .................. | G01S 13/723 342/70 |
| 2014/0330479 A1 * | 11/2014 | Dolgov | ................. | B60W 30/16 701/28 |
| 2015/0025708 A1 * | 1/2015 | Anderson | ............ | A61B 5/6804 701/2 |
| 2015/0192668 A1 * | 7/2015 | Mckitterick | ........... | G01S 13/89 702/159 |
| 2015/0192677 A1 * | 7/2015 | Yu | ......................... | G01S 17/936 356/5.01 |
| 2015/0276927 A1 * | 10/2015 | Karam | .................... | G01S 17/89 342/179 |
| 2015/0378241 A1 * | 12/2015 | Eldada | .................... | G02F 1/292 359/15 |
| 2016/0001701 A1 * | 1/2016 | Pagliani | ................ | G01S 13/865 701/36 |
| 2016/0161600 A1 * | 6/2016 | Eldada | .................... | G01S 17/89 356/5.01 |
| 2016/0161602 A1 * | 6/2016 | Prokhorov | ............ | G01S 7/4972 702/97 |

OTHER PUBLICATIONS

Gohring et al.; "Radar/Lidar Sensor Fusion for Car-Following on Highways"; 2011; 6 pages.

Cho et al.; "A Multi-Sensor Fusion System for Moving Object Detection and Tracking in Urban Driving Environments"; 2014 IEEE International Conference on Robotics & Automation (ICRA) Hong Kong Convention and Exhibition Center; May 31-Jun. 7, 2014; Hong Kong, China; 8 pages.

Hammerschmidt; "Researchers unlock potential of phased-array radar for automotive deployment"; [retrieved Jan. 30, 2015] retrieved from the Internet: <http://www.automotive-eetimes.com/en/researchers-unlock-potential-of-phased-array-radar-for-automotive-deployment.html?cmp_id=7&news_id=222903930>, Nov. 15, 2014; 2 pages.

* cited by examiner

COMBINED RADAR SENSOR AND LIDAR SENSOR PROCESSING

FIELD

The subject matter described herein relates in general to sensor systems and, more particularly, to sensor systems that include a plurality of different types of sensors.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. In many instances, the vehicle can include more than one type of sensor. The computing systems are configured to process the detected information to determine how to navigate and/or maneuver the vehicle through the surrounding environment.

SUMMARY

In one respect, the present disclosure is directed to a sensor system. The system includes one or more LIDAR sensors. The one or more LIDAR sensors can be configured to output signals. The system can also include one or more RADAR sensors. The one or more RADAR sensors can be configured to output signals. The system can further include a processor operatively connected to receive signals output by the one or more LIDAR sensors and the one or more RADAR sensors. The processor can be configured to process the signals received from the one or more LIDAR sensors and the signals received from the one or more RADAR sensors together.

In another respect, the present disclosure is directed to a sensor system for a vehicle. The system includes a vehicle and a sensor system operatively associated with the vehicle. The sensor system includes one or more LIDAR sensors. The one or more LIDAR sensors can be configured to output signals. The sensor system includes one or more RADAR sensors. The one or more RADAR sensors can be configured to output signals. The system can further include a processor. The processor can be operatively connected to receive signals output by the one or more LIDAR sensors and the one or more RADAR sensors. The processor can be configured to process signals received from the one or more LIDAR sensors and the signals received from the one or more RADAR sensors together.

In yet another respect, the present disclosure is directed to a method of sensing an environment using RADAR and LIDAR sensors. The method can include scanning at least a portion of the environment using one or more LIDAR sensors. The method can also include scanning at least a portion of the environment using one or more RADAR sensors. The method can further include, responsive to scanning at least a portion of the environment using one or more LIDAR sensors, the one or more LIDAR sensors can generate one or more first output signals. The method can also include, responsive to scanning at least a portion of the environment using one or more RADAR sensors, the one or more RADAR sensors can generate one or more second output signals. The first and second output signals can be processed together to generate a collective output signal.

DETAILED DESCRIPTION

Figure 1:
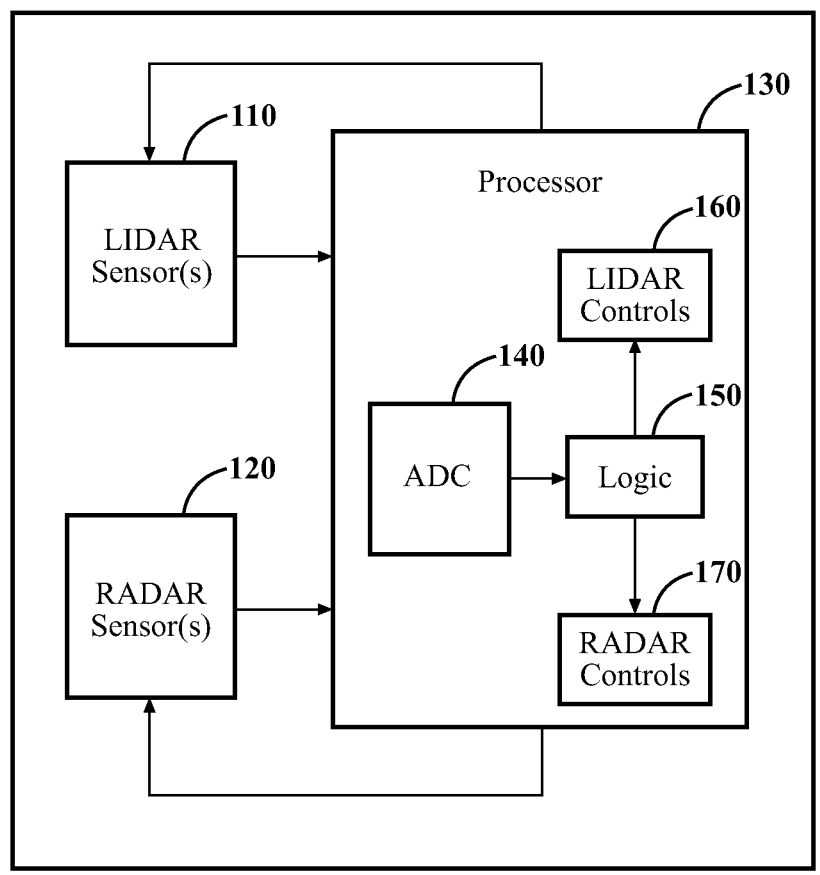
FIG. 1 is an example of a combined RADAR and LIDAR sensor system.

This detailed description relates to the sensing of an environment by a sensor system with plurality of different types of sensors. More particularly, this detailed description relates to the sensing of an environment by one or more LIDAR sensors and the one or more RADAR sensors. The sensor system can be configured to process signals received from the one or more LIDAR sensors and signals received from the one or more RADAR sensors together. The present detailed description relates to systems, methods and computer program products that incorporate such features. In at least some instances, such systems, methods and computer program products can improve the sensing of an environment and object detection, thereby enhancing safety and/or performance of a vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a sensor system 100 is shown. The sensor system 100 can include a plurality of different types of sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In the arrangement shown in FIG. 1, there can be two different types of sensors. However, it will be understood that arrangements are not limited to there being only two different types of sensors. Indeed, in one or more arrangements, there can be three or more different types of sensors.

According to arrangements described herein, the plurality of different types of sensors can work in combination with each other. The plurality of different types of sensors can form a sensor network.

In one or more arrangements, the sensor system 100 can include one or more RADAR sensors 120 and one or more LIDAR sensors 110. Each of these types of sensors will be described in turn below. Again, it will be understood that the one or more RADAR sensors 120 and the one or more LIDAR sensors 110 are provided merely as examples. In some arrangements, the sensor system 100 can include additional types of sensors. In some arrangements, the sensor system 100 can include alternative types of sensors for of the one or more RADAR sensors 120 and/or the one or more LIDAR sensors 110.

The one or more RADAR sensors 120 can use at least in part radio signals. The one or more RADAR sensors 120 can be configured to detect, determine, assess, monitor, measure, obtain, quantify and/or sense, directly or indirectly, the presence of one or more objects in an environment. The one or more RADAR sensors 120 can be used to also be configured to detect, determine, assess, monitor, measure, obtain, quantify and/or sense, directly or indirectly, information about such objects. Non-limiting and non-exhaustive examples of information about such objects can include the position, the speed, the range, the altitude, the direction, and/or the movement of detected objects.

The operation of RADAR is well known. Nonetheless, a general description of the technology will be provided to facilitate the description. Generally, the one or more RADAR sensors 120 can include a transmitter (not shown). The transmitter can be a component or group of components that can transmit radio signals (e.g. radio waves). In some instances, the transmitter can be configured to transmit pulses of radio signals. The transmitter can be, for example, an antenna or a dish. The radio signals can have any suitable characteristics. In one or more arrangements, the radio signals can have frequencies in any suitable range, such as, for example, in the range of about 300 GHz to about 3 kHz. In one or more arrangements, the radio signals can have wavelengths in any suitable range, such as, for example, in the range of about 1 millimeter to about 100 kilometers.

The radio signals can be transmitted into at least a portion of an environment. The radio signals can impinge upon objects in the environment that are located in the path of the radio signals. Generally, when the radio signals impinge upon an object, a portion of the radio signal can be returned. The returned portion of the radio signals can be detected by the RADAR sensors, such as by a receiver (e.g. an antenna or a dish). In one or more arrangements, the transmitter and the receiver can be the same structure. Responsive to receiving the returned radio signals, the one or more RADAR sensors can be configured to output signals.

In one or more arrangements, a plurality of RADAR sensors 120 can be configured as and/or provided as a phased array. Any suitable phased array can be used. In one or more arrangements, the plurality of RADAR sensors 120 can be configured as a dynamic phased array. In one or more arrangements, the plurality of RADAR sensors 120 can be configured as a fixed phased array. In one or more arrangements, the plurality of RADAR sensors 120 can be configured as an active phased array. In one or more arrangements, the plurality of RADAR sensors 120 can be configured as a passive phased array. The phased array RADAR sensors 120 can include any suitable type of beamformers, such as time domain beamformers and frequency domain beamformers.

In one or more arrangements, the phased array RADAR sensors 120 can be provided on a single chip, microchip or integrated circuit.

The one or more LIDAR sensors 110 can use at least in part laser signals. The one or more LIDAR sensors 110 can be configured to detect, determine, assess, monitor, measure, obtain, quantify and/or sense, directly or indirectly, the presence of one or more objects in an environment. The one or more LIDAR sensors 110 can be used to also be configured to detect, determine, assess, monitor, measure, obtain, quantify and/or sense, directly or indirectly, information about such objects. Non-limiting and non-exhaustive examples of information about such objects can include the position, the speed, the range, the altitude, the direction, and/or the movement of detected objects. The one or more LIDAR sensors 110 may be configured to operate in a coherent or an incoherent detection mode.

The operation of LIDAR is well known; however, a general description of the technology will nonetheless be provided herein to facilitate the description. Generally, the one or more LIDAR sensors 110 can include a transmitter (not shown). The transmitter can be can component or group of components that can transmit laser signals (e.g. laser light energy). As an example, the transmitter can be a laser, laser rangefinder, LIDAR, and/or laser scanner. The laser signals can have any suitable characteristics. In one or more arrangements, the laser signals can be from any suitable portion of the electromagnetic spectrum, such as from the ultraviolet, visible, or near infrared portions of the electromagnetic spectrum. The laser signals can be eye safe.

The laser signals can be transmitted into at least a portion of an environment The laser signals can impinge upon objects in the environment that are located in the path of the laser signals. Generally, when the laser signals impinge upon an object, a portion of the laser signals can be returned (e.g. by reflection). The returned portion of the laser signals can be detected by the LIDAR sensors, such as by a receiver (e.g. photodetectors, solid state photodetectors, photodiodes, or photomultipliers). Responsive to receiving the returned laser signals, the one or more LIDAR sensors can be configured to output signals.

In one or more arrangements, a plurality of LIDAR sensors 110 can be configured as and/or provided as a phased array. Any suitable phased array can be used. In one or more arrangements, the plurality of LIDAR sensors 110 can be configured as a dynamic phased array. In one or more arrangements, the plurality of LIDAR sensors 110 can be configured as a fixed phased array. In one or more arrangements, the plurality of LIDAR sensors 110 can be configured as an active phased array. In one or more arrangements, the plurality of LIDAR sensors 110 can be configured as a passive phased array. The phased array LIDAR sensors 110 can include any suitable type of beam formers, such as time domain beam formers and frequency domain beam formers. In one or more arrangements, the phased array LIDAR sensors 110 can be provided on a single chip, microchip or integrated circuit.

The one or more RADAR sensors and the one or more LIDAR sensors can be operatively connected to a processor 130. "Processor" means any component or group of components that are configured to execute any of the processes described herein or any form of instructions to carry out such processes or cause such processes to be performed. The processor 130 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 130 can include at least one hardware circuit (e.g., an integrated circuit) configured to carry out instructions contained in program code. In arrangements in which there is a plurality of processors 130, such processors can work independently from each other or one or more processors can work in combination with each other.

The processor 130 can be operatively connected to receive signals output by the one or more LIDAR sensors and the one or more RADAR sensors. The processor 130 can be configured to process together signals received from both the LIDAR sensors and the RADAR sensors. As used herein, "process together" means that signals received from a plurality of different sensor types are combined and processed together as one collective set of signals. Thus, according to arrangements herein, the signals output by the one or more LIDAR sensors and the signals output by the one or more RADAR sensors can be combined and processed together as one data set. Processing together can be performed minimal or no prior processing of the signals output by the one or more LIDAR sensors and the signals output by the one or more RADAR sensors.

As noted above the output signals from the one or more RADAR sensors 120 and/or the one or more LIDAR sensors 110 can have any suitable form. In one or more arrangements, the signals output by the one or more LIDAR sensors can be a first waveform, and the signals output by the one or more RADAR sensors can be a second waveform. In one or more arrangements, the first waveform can be substantially the same as the second waveform. The first and second waveforms can be any suitable type of waveform. As an example, the first and second waveforms can be a modulated continuous-wave, a frequency-modulated continuous wave (FM-CW), or other wave form.

It should be noted that the processor 130 can include or can be operatively connected to one or more other elements. For instance, the processor 130 can include or can be operatively connected to an analog to digital converter 140. The processor 130 can include or can be operatively connected to program logic/instructions 150 executable by the processor 130. Such program logic 150 can include instructions to execute various functions of the sensor system 100. Alternatively or in addition, the program logic 150 can be included in a data store (not shown) operatively connected to the processor 130. The processor 130 can include or be operatively connected to one or more LIDAR controls 160 and/or one or more RADAR controls 170.

It should be noted that, in one or more arrangements, the program logic 150 for the LIDAR sensor(s) 110 and the RADAR sensor(s) 120 can be the same. Thus, the same program logic 150 can be used for processing signals received from the one or more LIDAR sensors 110 and the one or more RADAR sensors 120. Likewise, the same program logic 150 can be used for processing control signals to send to the LIDAR control(s) 160, the RADAR control(s) 170, the LIDAR sensor(s) 110 and/or the RADAR sensor(s) 120.

The processor 130 can be configured to output one or more control signals to the LIDAR sensor(s) 110 and the RADAR sensor(s). Alternatively or in addition, the processor 130 can be configured to output one or more signals to another system or component. As an example, the one or more signals can be sent to the processor of a vehicle.

Figure 2:
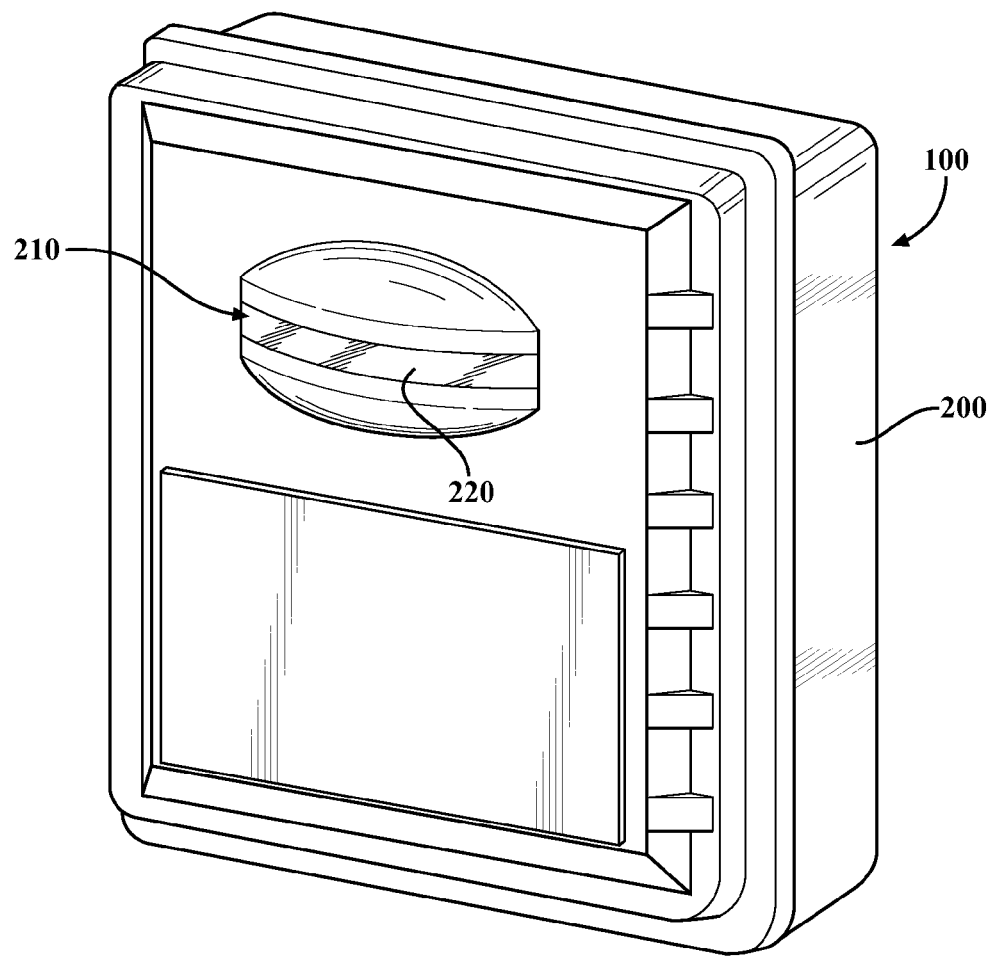
FIG. 2 is an example of housing for a combined RADAR and LIDAR sensor system.

In one or more arrangements, a housing can be provided for at least a portion of the sensor system 100. Referring to FIG. 2, an example of a housing 200 for the sensor system 100 is shown. The housing 200 can be any suitable shape. In one or more arrangements, the housing 200 can be substantially rectangular, as is shown in FIG. 1. However, the housing 200 is not limited to this shape. Indeed, the housing 200 can be substantially triangular, parallelogram, trapezoidal, circular, oval, polygonal, or irregular, just to name a few possibilities.

The housing 200 can be configured to be selectively opened and closed to allow the sensor system 100 or portions thereof to be placed into, removed from and/or accessed. FIG. 2 shows an example of the housing 200 in a closed configuration. The housing 200 can be configured in any suitable manner to permit selective opening and closing thereof. For example, in one embodiment, the housing 200 can be made of a plurality of housing portions. The plurality of housing portions can be attached to each other in any suitable manner, such as by one or more fasteners (e.g. screws, bolts, hinges, pins, rods, clips, etc.), one or more adhesives, and/or one or more forms of mechanical engagement (e.g. interlocking structures or features, cooperating features, protrusions/openings, etc.), just to name a few possibilities. In one or more arrangements, the housing 200 can include one or more access panels (not shown), which can be selectively removed to access the components located within.

The housing 200 can be made of one or more suitable materials, including, for example, metals, polymers, resins, composites or plastics. In one or more arrangements, the housing 200 can be made of a material that does not interfere with or minimizes interference with the operation of the one or more RADAR sensors 120 and/or the one or more LIDAR sensors 110, including the transmitting and receiving of their respective signals.

In one or more arrangements, the housing 200 can include an aperture 210. The aperture 210 can be provided to allow laser energy emitted from the one or more LIDAR sensors 110 to be emitted from and received by the LIDAR sensors 110. The aperture 210 can have any suitable size and/or shape.

In one or more arrangements, the aperture 210 can be at least partially closed by a window element 220. The window element 220 can be a lens or other element through which at least laser signals can be transmitted and received.

The window element 220 can be made of any suitable material. For instance, the window element 220 can be made of glass, plastic, or mineral (e.g. sapphire, diamond, etc.). In one or more arrangements, the window element 220 can be treated or configured to provide desired optical or other characteristics. For instance, at least a portion of the window element 220 can be coated with a material or substance.

In one or more arrangements, the window element 220 can be configured so as not to alter the characteristics of laser signals emitted from or received by the one or more LIDAR sensors 110. In one or more arrangements, the window element 220 can be configured to alter one or more characteristics of laser signals emitted from or received by the one or more LIDAR sensors 110. In one or more arrangements, the window element can be configured as an optical concentrator, which includes total internal reflectors and optical elements having a wall coated with a reflective metal, a dielectric material, or a reflective coating to reflect or redirect incident light.

The window element 220 can be attached within the aperture 210, on an inner side of the housing 200, and/or on an outer side of the housing 200. The window element 220 can be attached to the housing 200 in any suitable manner, such as such as by one or more fasteners (e.g. screws, bolts, hinges, pins, rods, clips, etc.), one or more adhesives, one or more forms of bonding and/or one or more forms of mechanical engagement (e.g. interlocking structures or features, cooperating features, protrusions/openings, etc.), just to name a few possibilities.

The window element 220 can have any suitable size and/or shape. The window element 220 can be a substantially flat, curved, bowed, substantially hemi-spherical, substantially semi-spherical, substantially rectangular, or substantially circular, just to name a few possibilities.

As noted above, the sensor system 100 can include a processor 130. In one or more arrangements, the processor 130 can be located within the housing 200. In one or more arrangements, the processor 130 can be located outside of the housing 200. In either of such arrangements, the processor 130 can be operatively connected to the one or more LIDAR sensors 110 and the one or more RADAR sensors 120.

Figure 3:
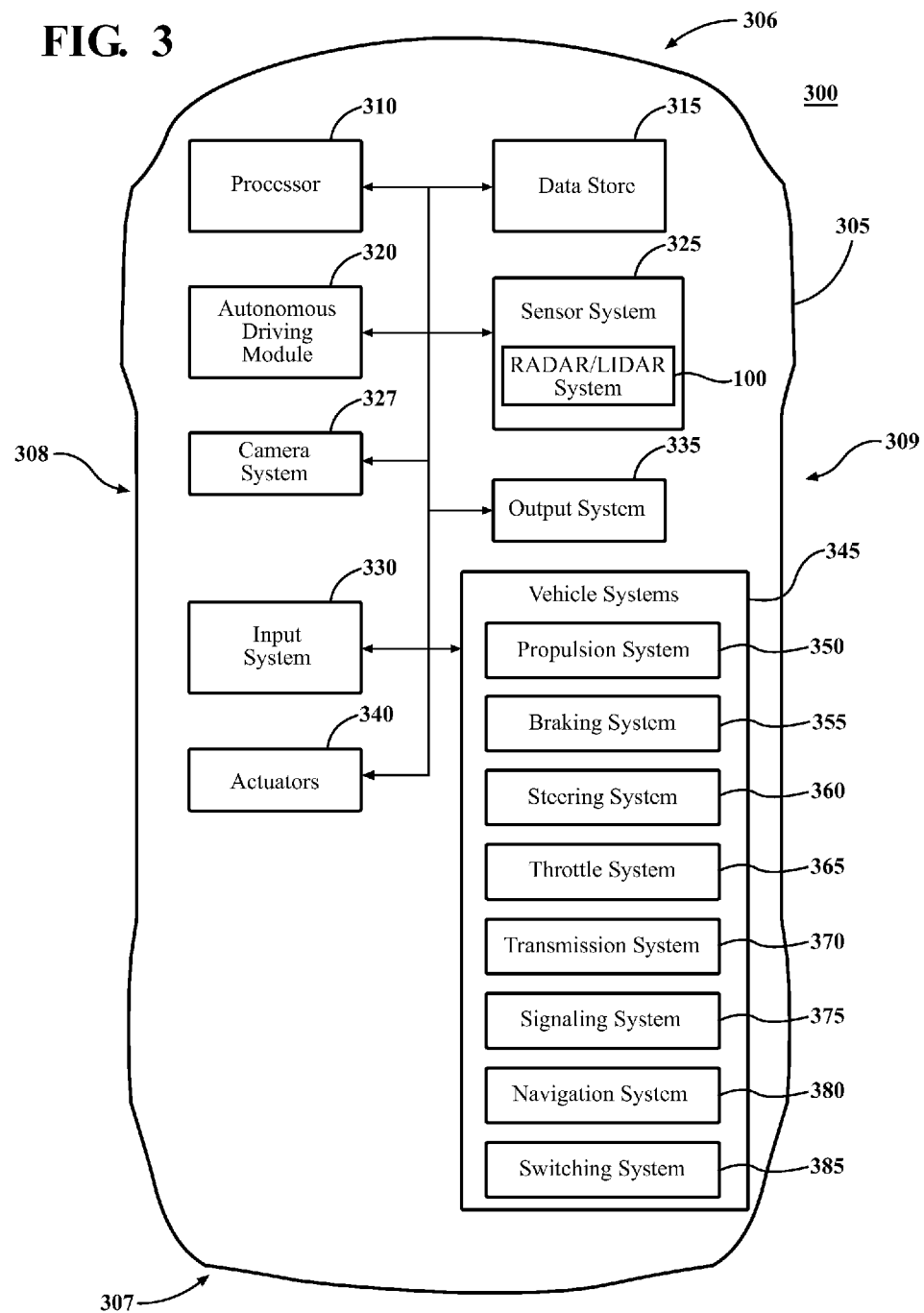
FIG. 3 is an example of a system in which an autonomous vehicle includes a combined RADAR and LIDAR sensor system.

The sensor system 100 can be used in various applications. One example of a possible application of the sensor system 100 is shown in connection with FIG. 3. FIG. 3 is an example of a system 300 in which the sensor system 100 is used in a vehicular application. However, it will be understood that arrangements are not limited to the particular application shown.

An example a vehicle 305 is shown in FIG. 3. As used herein, "vehicle" means any form of motorized transport. In one or more implementations, the vehicle 305 can be an automobile. While arrangements will be described herein with respect to automobiles, it will be understood that embodiments are not limited to automobiles. In one or more implementations, the vehicle 305 may be a watercraft, an aircraft or any other form of motorized transport. The vehicle 305 can have a front end 306, a back end 307 and lateral sides 308, 309.

In one or more arrangements, the vehicle 305 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 305 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver. In one or more arrangements, the vehicle 305 may operate in a manual mode, but one or more components and/or systems of the vehicle 305 can be autonomous. As an example, the vehicle 305 can include an adaptive cruise control system and/or an object alert system. Thus, while arrangements herein will be described in connection with an autonomous vehicle, it will be appreciated that arrangements described herein are not limited to autonomous vehicles.

The vehicle 305 can include various elements, some of which may be a part of an autonomous driving system. Some of the possible elements of the vehicle 305 are shown in FIG. 3 and will now be described. It will be understood that it is not necessary for the vehicle 305 to have all of the elements shown in FIG. 3 or described herein. The vehicle 305 can have any combination of the various elements shown in FIG. 3. Further, the vehicle 305 can have additional elements to those shown in FIG. 3. In some arrangements, vehicle 305 may not include one or more of the elements shown in FIG. 3. Further, while the various elements are shown as being located within the vehicle 305 in FIG. 3, it will be understood that one or more of these elements can be located external to the vehicle 305. Further, the elements shown may be physically separated by large distances.

The vehicle 305 can include one or more processors 310. "Processor" means any component or group of components that are configured to execute any of the processes described herein or any form of instructions to carry out such processes or cause such processes to be performed. The processor 310 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 310 can include at least one hardware circuit (e.g., an integrated circuit) configured to carry out instructions contained in program code. In arrangements in which there is a plurality of processors 310, such processors can work independently from each other or one or more processors can work in combination with each other. In one or more arrangements, the processor 310 can be a main processor of the vehicle 305. For instance, the processor 310 can be an engine control unit (ECU). In one or more arrangements the processor 310 can be the processor 130 of the sensor system 100.

The vehicle 305 can include one or more data stores 315 for storing one or more types of data. The data store 315 can include volatile and/or non-volatile memory. Examples of suitable data stores 315 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 315 can be a component of the processor 310, or the data store 315 can be operatively connected to the processor 310 for use thereby. The term "operatively connected," as used throughout this description, can include direct or indirect connections, including connections without direct physical contact.

The vehicle 305 can include an autonomous driving module 320. The autonomous driving module 320 can be implemented as computer readable program code that, when executed by a processor, implement one or more of the various processes described herein, including, for example, determining current driving maneuvers for the vehicle 305, future driving maneuvers and/or modifications. The autonomous driving module 320 can also cause, directly or indirectly, such driving maneuvers or modifications thereto to be implemented. The autonomous driving module 320 can be a component of the processor 310, or the autonomous driving module 320 can be executed on and/or distributed among other processing systems to which the processor 310 is operatively connected.

The autonomous driving module 320 can include instructions (e.g., program logic) executable by the processor 310.

Such instructions can include instructions to execute various vehicle functions and/or to transmit data to, receive data from, interact with, and/or control the vehicle 305 or one or more systems thereof (e.g. one or more of vehicle systems 345). Alternatively or in addition, the data store 315 may contain such instructions.

The vehicle 305 can include a vehicle sensor system 325. The vehicle sensor system 325 can include one or more sensors. In arrangements in which the vehicle sensor system 325 includes a plurality of sensors, the sensors can work independently from each other. Alternatively, two or more of the sensors can work in combination with each other. The vehicle sensor system 325 and/or the one or more sensors can be operatively connected to the processor 310, the data store 315, the autonomous driving module 320 and/or other element of the vehicle 305.

The vehicle sensor system 325 can include any suitable type of sensor. For example, the vehicle sensor system 325 can include one or more sensors configured to detect, determine, assess, monitor, measure, quantify and/or sense information about the vehicle 305. Alternatively or in addition, the vehicle sensor system 325 can include one or more sensors configured to detect, determine, assess, monitor, measure, quantify and/or sense information about the external environment in which the vehicle 305 is located, including information about objects in the external environment. Such objects may be stationary object or moving objects. Alternatively or in addition to one or more of the above examples, the vehicle sensor system 325 can include one or more sensors configured to detect, determine, assess, monitor, measure, quantify and/or sense the location of the vehicle 305 and/or the location of objects in the environment relative to the vehicle 305. Various examples of these and other types of sensors will be described herein. It will be understood that the embodiments are not limited to the particular sensors described.

The vehicle sensor system 325 can include one or more sensor systems 100 described above in connection with FIG. 1 and/or FIG. 2. The one or more sensor systems 100 can be configured to detect, determine, assess, monitor, measure, quantify and/or sense objects in at least a portion of the external environment of the vehicle 305 and/or information/data about such objects. The sensor systems 100 can be provided in any suitable location of the vehicle 305. When a plurality of the sensor systems 100 is used, the plurality of sensor systems 100 can be distributed about the vehicle 305 in any suitable manner. In one or more arrangements, one or more of the sensor systems 100 can be located at or near the front end 302 of the vehicle 305, including on a right side, a left side and/or a central region thereof. Additionally or alternatively, one or more of the sensor systems 100 can be located in any suitable location at or near the back end 307 of the vehicle 305, including on a right side, a left side and/or a central region thereof. Alternatively or in addition, one or more of the sensor systems 100 can be located on one of the lateral sides 308, 309 of the vehicle 305.

Again, other sensors can be included as part of the vehicle sensor system 325. For instance, the vehicle sensor system 325 can include one or more sensors configured to detect, determine, assess, monitor, measure, quantify and/or sense position and orientation changes of the vehicle 305. The vehicle sensor system 325 can include one or more sensors that can monitor one or more internal systems of the vehicle 305 (e.g., an $O_2$ monitor, a fuel gauge, an engine oil temperature, coolant temperature, etc.). Alternatively or in addition to the sensor system 100, the vehicle sensor system 325 can include one or more sensors that can detect, determine, assess, monitor, measure, obtain, quantify and/or sense, directly or indirectly, the presence of one or more objects in an environment and information about such objects. For instance, the vehicle sensor system 325 can include one or more ultrasound sensors. The vehicle sensor system 325, the processor 310, the processor 130, and/or one or more other elements can be operable to control movements and/or operation of one or more of the sensors of the vehicle sensor system 325.

It should be noted that any of the sensors described herein can be provided in any suitable location with respect to the vehicle 305. For instance, one or more sensors can be located within the vehicle 305, one or more sensors can be located on the exterior of the vehicle and/or one or more sensors can be located so as to be exposed to the exterior of the vehicle 305.

The vehicle 305 can include a camera system 327. In one or more arrangements, the camera system 327 can be a part of the vehicle sensor system 325. The camera system 327 can include a one or more cameras. "Camera" is defined as any device, component, and/or system that can capture visual data. "Visual data" includes video and/or image information/data. The visual data can be in any suitable form.

In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. One or more of the cameras can be configured with zoom in and/or zoom out capabilities. The position of one or more of the cameras can be fixed, or the position of one or more of the cameras can be moved in any suitable manner.

The vehicle 305 can include an input system 330. An "input system" is defined as any device, component, system, element or arrangement or groups thereof that enable information/data to be entered into a machine. The input system 330 can receive an input from a vehicle occupant (e.g. a driver or a passenger). Any suitable input system 330 can be used, including, for example, a keypad, display, touch screen, multi-touch screen, button, joystick, mouse, trackball, microphone and/or combinations thereof.

The vehicle 305 can include an output system 335. An "output system" is defined as any device, component, system, element or arrangement or groups thereof that enable information/data to be presented to a vehicle occupant (e.g. a person, a vehicle occupant, etc.). The output system 335 can present information/data to a vehicle occupant. The output system 335 can include a display, as described above. Alternatively or in addition, the output system 335 may include a microphone, earphone and/or speaker. Some components of the vehicle 305 may serve as both a component of the input system 330 and a component of the output system 335.

The vehicle 305 can include one or more vehicle systems 345. Various examples of the one or more vehicle systems 345 are shown in FIG. 3. However, the vehicle 305 can include more, fewer or different systems. It should be appreciated that although particular vehicle systems are separately defined, each or any of the systems or portions thereof may be otherwise combined or segregated via hardware and/or software within the vehicle 305.

The vehicle 305 can include a propulsion system 350. The propulsion system 350 can include one or more mechanisms, devices, elements, components, systems, and/or combinations thereof, now known or later developed, configured to provide powered motion for the vehicle 305. The propulsion system 350 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 305.

The vehicle 305 can include wheels, tires and/or tracks. Any suitable type of wheels, tires and/or tracks can be used. In one or more arrangements, the wheels, tires and/or tracks of the vehicle 305 can be configured to rotate differentially with respect to other wheels, tires and/or tracks of the vehicle 305. The wheels, tires and/or tracks can be made of any suitable material.

The vehicle 305 can include a braking system 355. The braking system 355 can include one or more mechanisms, devices, elements, components, systems, and/or combinations thereof, now known or later developed, configured to decelerate the vehicle 305. As an example, the braking system 355 can use friction to slow the wheels/tires. The braking system 355 can convert the kinetic energy of the wheels/tires to electric current.

Further, the vehicle 305 can include a steering system 360. The steering system 360 can include one or more mechanisms, devices, elements, components, systems, and/or combinations thereof, now known or later developed, configured to adjust the heading of the vehicle 305.

The vehicle 305 can include a throttle system 365. The throttle system 365 can include one or more mechanisms, devices, elements, components, systems, and/or combinations thereof, now known or later developed, configured to control the operating speed of an engine/motor of the vehicle 305 and, in turn, the speed of the vehicle 305.

The vehicle 305 can include a transmission system 370. The transmission system 370 can include one or more mechanisms, devices, elements, components, systems, and/or combinations thereof, now known or later developed, configured to transmit mechanical power from the engine/motor of the vehicle 305 to the wheels/tires. For instance, the transmission system 370 can include a gearbox, clutch, differential, drive shafts, and/or other elements. In arrangements where the transmission system 370 includes drive shafts, the drive shafts can include one or more axles that are configured to be coupled to the wheels/tires.

The vehicle 305 can include a signaling system 375. The signaling system 375 can include one or more mechanisms, devices, elements, components, systems, and/or combinations thereof, now known or later developed, configured to provide illumination for the driver of the vehicle 305 and/or to provide information with respect to one or more aspects of the vehicle 305. For instance, the signaling system 375 can provide information regarding the vehicle's presence, position, size, direction of travel, and/or the driver's intentions regarding direction and speed of travel. For instance, the signaling system 375 can include headlights, taillights, brake lights, hazard lights and turn signal lights.

The vehicle 305 can include a navigation system 380. The navigation system 380 can include one or more mechanisms, devices, elements, components, systems, applications and/or combinations thereof, now known or later developed, configured to determine the geographic location of the vehicle 305 and/or to determine a travel route for the vehicle 305.

The navigation system 380 can include one or more mapping applications to determine a travel route for the vehicle 305. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 380 can be configured to update the travel route dynamically while the vehicle 305 is in operation.

The navigation system 380 can include a global positioning system, a local positioning system or a geolocation system. The navigation system 380 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 380 can use Transmission Control Protocol (TCP) and/or a Geographic information system (GIS) and location services.

The navigation system 380 may include a transceiver configured to estimate a position of the vehicle 305 with respect to the Earth. For example, navigation system 380 can include a GPS transceiver to determine the vehicle's latitude, longitude and/or altitude. The navigation system 380 can use other systems (e.g. laser-based localization systems, inertial-aided GPS, and/or camera-based localization) to determine the location of the vehicle 305.

Alternatively or in addition, the navigation system 380 can be based on access point geolocation services, such as using the W3C Geolocation Application Programming Interface (API). With such a system, the location of the vehicle 305 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 305 is determined will depend on the manner of operation of the particular location tracking system used.

The processor 310 and/or the autonomous driving module 320 can be operatively connected to communicate with the various vehicle systems 345 and/or individual components thereof. For example, returning to FIG. 1, the processor 310 and/or the autonomous driving module 320 can be in communication to send and/or receive information from the various vehicle systems 345 to control the movement, speed, maneuvering, heading, direction, etc. of vehicle 305. The processor 310 and/or the autonomous driving module 320 may control some or all of these vehicle systems 345 and, thus, may be partially or fully autonomous.

The processor 310 and/or the autonomous driving module 320 may be operable to control the navigation and/or maneuvering of the vehicle 305 by controlling one or more of the vehicle systems 345 and/or components thereof. For instance, when operating in an autonomous mode, the processor 310 and/or the autonomous driving module 320 can control the direction and/or speed of the vehicle 305. The processor 310 and/or the autonomous driving module 320 can cause the vehicle 305 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 305 can include one or more actuators 340. The actuators 340 can be any element or combination of elements operable to modify, adjust and/or alter one or more of the vehicle systems 345 or components thereof to respon- sive to receiving signals or other inputs from any suitable source, including, for example, the processor, 130, the processor 310 and/or the autonomous driving module 320. Any suitable actuator can be used. For instance, the one or more actuators 340 can include motors, pneumatic actuators, hydraulic pistons, relays, solenoids, and/or piezoelectric actuators, just to name a few possibilities.

According to arrangements described herein, the vehicle 305 can be configured for determining and/or implementing any suitable driving action based on and/or using, at least in part, data/information received from the sensor system 100. For instance, data/information received from the sensor system 100 can be used to determine a current driving action, a future driving action, and/or a modification to a current or future driving action. As another example, data/ information received from the sensor system 100 can be used to determine whether an alert or warning should be presented to an occupant of the vehicle 305 and/or to some other non-occupant of the vehicle 305.

Figure 4:
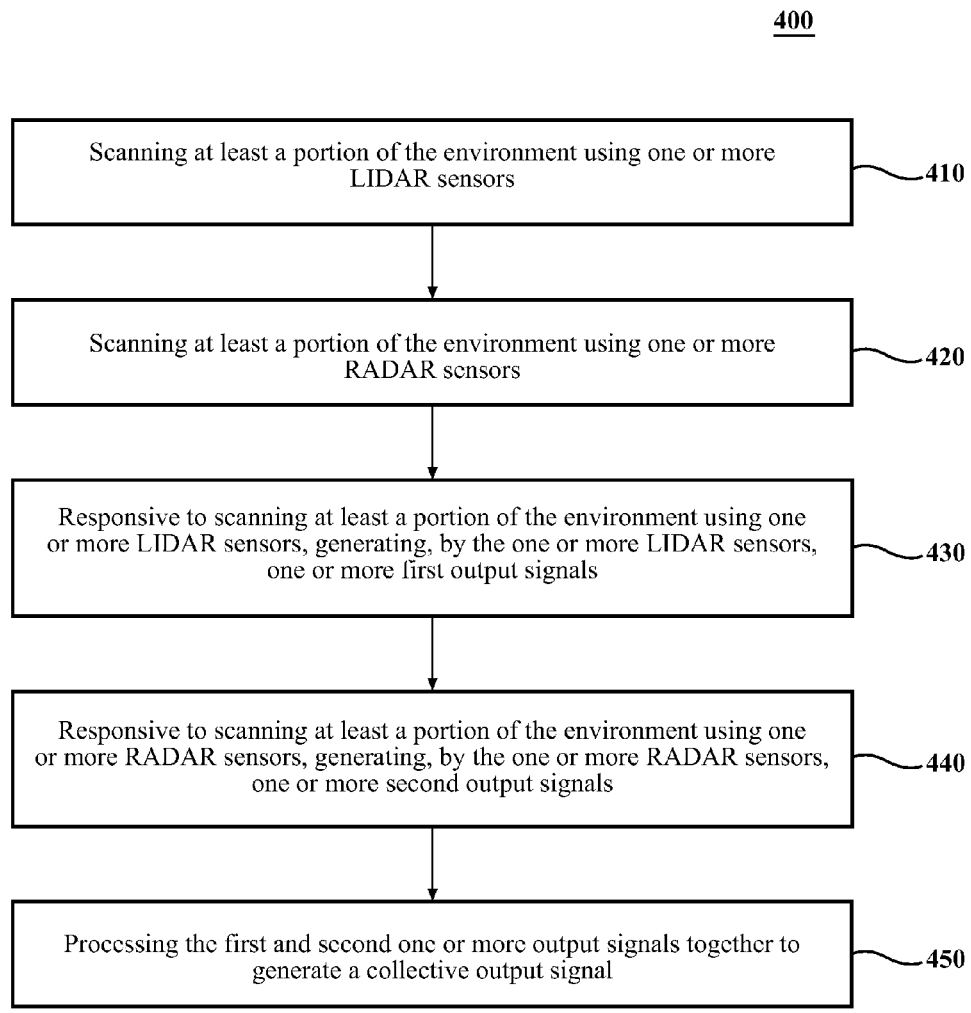
FIG. 4 is a method of sensing an environment using RADAR and LIDAR sensors.

Now that the various potential systems, devices, elements and/or components of the sensor system 100 have been described, various methods for using the sensor system 100, including in connection with a vehicle 305, will now be described. Referring now to FIG. 4, an example of a method 400 of sensing an environment is shown. Various possible steps of method 400 will now be described. The method 400 illustrated in FIG. 4 may be applicable to the embodiments described above in relation to FIGS. 1-3, but it is understood that the method 400 can be carried out with other suitable systems and arrangements. Moreover, the method 400 may include other steps that are not shown here, and in fact, the method 400 is not limited to including every step shown in FIG. 4. The steps that are illustrated here as part of the method 400 are not limited to this particular chronological order. Indeed, some of the steps may be performed in a different order than what is shown and/or at least some of the steps shown can occur simultaneously.

At block 410, at least a portion of the environment can be scanned using one or more LIDAR sensors. "Scanning" includes transmitting a signal and receiving a returned signal. The scanning of at least a portion of the environment can occur in response to the processor 130 activating the one or more LIDAR sensors 110. Any suitable form of scanning can be performed. The method can continue to block 420.

At block 420, at least a portion of the environment can be scanned using one or more RADAR sensors. The scanning of at least a portion of the environment can occur in response to the processor 130 activating the one or more RADAR sensors 120. Any suitable form of scanning can be performed. In one or more arrangements, the scanning by the one or more RADAR sensors 120 and the scanning by the one or more LIDAR sensors 110 can occur substantially simultaneously. In one or more arrangements, the at least a portion of the environment scanned by the one or more LIDAR sensors 110 can be substantially the same as the at least a portion of the environment scanned by the one or more RADAR sensors 120. In one or more arrangements, the at least a portion of the environment scanned by the one or more LIDAR sensors 110 can overlap the at least a portion of the environment scanned by the one or more RADAR sensors 120. The method can continue to block 430.

At block 430, responsive to scanning the at least a portion of the environment using one or more LIDAR sensors, one or more first output signals can be generated by the one or more LIDAR sensors. The first output signals can have any suitable waveform. The method can continue to block 440.

At block 440, responsive to scanning at least a portion of the environment using one or more RADAR sensors, one or more second output signals can be generated by the one or more RADAR sensors. The second output signals can have any suitable waveform. The waveform of the first output signals can be substantially the same as the waveform of the second output signals. The method can continue to block 450.

At block 450, the first and second output signals can be processed together to generate a collective output signal. Thus, the first and second output signals can be combined and the collective signals can be processed together. Such processing can be performed by the processor 130.

The method 400 can end. Alternatively, the method 400 can return to block 410. Alternatively, the method 400 can include additional blocks. For instance, the signals that are processed together can be used, at least in part, to determine a driving action to implement or to recommend to a vehicle driver. Alternatively or in addition, the signals that are processed together can be used to alert a driver as to the presence of one or more objects in the surrounding environment. Alternatively or in addition, the signals that are processed together can be used at least in part in connection with an adaptive cruise control system of the vehicle.

It will be appreciated that arrangements described herein can provide numerous benefits, including one or more of the benefits mentioned herein. For example, arrangements described herein can increase the robustness of the sensor system by enabling two different yet complementary sensor technologies to be used. Further, the use of complementary sensors as described herein can also improve the detection of objects in an environment. Such complementary sensors can be particularly beneficial when there is a high degree of uncertainty with one of the types of sensors. For instance, if there are non-metal objects in the environment and/or under certain weather conditions (e.g. snow, rain, etc.), there may be a higher degree of uncertainty associated with RADAR sensors. However, in such instances, there would not be a higher or an appreciably higher degree of uncertainty associated with LIDAR sensors. Further, arrangements described herein can enable the use of the same control algorithm and/or processing algorithm for the RADAR sensors and the LIDAR sensors. In addition, arrangements described herein can allow data/information received from the LIDAR and RADAR sensors to be fused or combined together for processing. Thus, the same processing algorithm can be used for data/information received from the RADAR sensors and the LIDAR sensors.

Still further, the RADAR sensors and the LIDAR sensors can be combined into a single housing or package. As a result, the overall size of the combined sensors can be reduced compared to separate sensor packages, thereby saving space in a vehicle or other system in which the sensor system is used. In some instances, the sensor system may be able to be retrofit into existing sensor systems. Further, arrangements described herein can improve the performance and/or safety of a vehicle or other system in which the sensor system is used.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A sensor system comprising:
one or more LIDAR sensors, the one or more LIDAR sensors being configured to output signals;
one or more RADAR sensors, the one or more RADAR sensors being configured to output signals; and
a processor operatively connected to receive signals output by the one or more LIDAR sensors and the one or more RADAR sensors, the processor being configured to process signals received from the LIDAR sensors and the signals received from the RADAR sensors together as one data set with no prior processing of the signals output by the one or more LIDAR sensors or the signals output by the one or more RADAR sensors, whereby object detection processing of the signals output by the one or more LIDAR sensors and the signals output by the one or more RADAR sensors is not performed prior to being received by the processor.

2. The sensor system of claim 1, wherein the signals output by the one or more LIDAR sensors are of a first waveform, wherein the signals output by the one or more RADAR sensors are of a second waveform, and wherein the first waveform is the same as the second waveform.

3. The sensor system of claim 1, wherein the processor is operatively connected to send control signals to the one or more LIDAR sensors and the one or more RADAR sensors.

4. The sensor system of claim 3, wherein the control signals include activating the one or more LIDAR sensors and the one or more RADAR sensors to simultaneously scan at least a portion of an environment.

5. The sensor system of claim 1, further including a housing, wherein the one or more LIDAR sensors and the one or more RADAR sensors are located within the housing.

6. The sensor system of claim 5, wherein the housing includes an aperture, wherein the one or more LIDAR sensors are operatively positioned with respect to the aperture to send and receive sensing signals therethrough.

7. The sensor system of claim 6, further including a window element operatively positioned with respect to the aperture, wherein the window element is configured to allow the one or more LIDAR sensors to send and receive sensing signals therethrough.

8. The sensor system of claim 1, wherein the one or more LIDAR sensors are configured as a phased array, and wherein the one or more RADAR sensors are configured as a phased array.

9. A system comprising:
a vehicle;
a sensor system operatively associated with the vehicle, the sensor system including:
one or more LIDAR sensors, the one or more LIDAR sensors being configured to output signals, and
one or more RADAR sensors, the one or more RADAR sensors being configured to output signals; and
a processor operatively connected to receive signals output by the one or more LIDAR sensors and the one or more RADAR sensors, the processor being configured to process signals received from the one or more LIDAR sensors and the signals received from the one or more RADAR sensors together as one data set with no prior processing of the signals output by the one or more LIDAR sensors or the signals output by the one or more RADAR sensors, whereby object detection processing of the signals output by the one or more LIDAR sensors and the signals output by the one or more RADAR sensors is not performed prior to being received by the processor.

10. The system of claim 9, wherein the signals output by the one or more LIDAR sensors are of a first waveform, wherein the signals output by the one or more RADAR sensors are of a second waveform, and wherein the first waveform is the same as the second waveform.

11. The system of claim 9, wherein the processor is operatively connected to send control signals to the one or more LIDAR sensors and the one or more RADAR sensors.

12. The system of claim 11, wherein the control signals include activating the one or more LIDAR sensors and the one or more RADAR sensors to simultaneously scan at least a portion of an environment.

13. The system of claim 9, further including a housing, wherein the one or more LIDAR sensors and the one or more RADAR sensors are located within the housing.

14. The system of claim 13, wherein the housing includes an aperture, wherein the one or more LIDAR sensors are operatively positioned with respect to the aperture to send and receive sensing signals therethrough.

15. The system of claim 14, further including a window element operatively positioned with respect to the aperture, wherein the window element is configured to allow the one or more LIDAR sensors to send and receive sensing signals therethrough.

16. The system of claim 9, wherein the one or more LIDAR sensors are configured as a phased array, and wherein the one or more RADAR sensors are configured as a phased array.

17. The system of claim 9, wherein the vehicle is an autonomous vehicle, the autonomous vehicle including one or more actuators operatively connected to one or more vehicle systems to implement driving maneuvers, and wherein the actuators are operatively connected to the processor.

18. A method of sensing an environment using RADAR and LIDAR sensors comprising:
scanning at least a portion of the environment using one or more LIDAR sensors;
scanning at least a portion of the environment using one or more RADAR sensors;
responsive to scanning at least a portion of the environment using one or more LIDAR sensors, generating, by the one or more LIDAR sensors, one or more first output signals;
responsive to scanning at least a portion of the environment using one or more RADAR sensors, generating, by the one or more RADAR sensors, one or more second output signals; and
processing, using one or more processors, the one or more first output signals and the one or more second output signals together as one data set with no prior processing of the one or more first output signals or the one or more second output signals to generate a collective output signal, whereby object detection processing of the one or more first output signals and the one or more second output signals is not performed prior to being received by the one or more processors.

19. The method of claim 18, wherein the one or more first output signals are of a first waveform, wherein the one or more second output signals are of a second waveform, and wherein the first waveform is the same as the second waveform.

20. The method of claim 18, wherein the one or more LIDAR sensors are configured as a phased array, wherein scanning at least a portion of the environment using one or more LIDAR sensors includes phase-array scanning at least a portion of the environment using one or more LIDAR sensors, and
wherein the one or more RADAR sensors are configured as a phased array, wherein scanning at least a portion of the environment using one or more RADAR sensors includes phase-array scanning at least a portion of the environment using one or more RADAR sensors.

21. The sensor system of claim 1, further including a housing, wherein the processor, the one or more LIDAR sensors, and the one or more RADAR sensors are located within the housing.

22. The sensor system of claim 2, wherein the first waveform and the second waveform are both a modulated continuous-wave or a frequency-modulated continuous wave.

* * * * *